(12) United States Patent
Soer et al.

(10) Patent No.: US 10,887,960 B2
(45) Date of Patent: Jan. 5, 2021

(54) COLOR TUNABLE LIGHT EMITTING DIODE (LED) SYSTEMS, LED LIGHTING SYSTEMS, AND METHODS

(71) Applicant: LUMILEDS LLC, San Jose, CA (US)

(72) Inventors: Wouter Anthon Soer, Eindhoven (NL); Werner Goetz, Palo Alto, CA (US)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/368,413

(22) Filed: Mar. 28, 2019

(65) Prior Publication Data

US 2020/0314976 A1 Oct. 1, 2020

(51) Int. Cl.
*H05B 45/20* (2020.01)
*H05B 45/37* (2020.01)
*H05B 47/105* (2020.01)
*C09K 11/08* (2006.01)
*C09K 11/77* (2006.01)

(52) U.S. Cl.
CPC .......... *H05B 45/20* (2020.01); *C09K 11/0883* (2013.01); *C09K 11/7774* (2013.01); *H05B 45/37* (2020.01); *H05B 47/105* (2020.01)

(58) Field of Classification Search
None
See application file for complete search history.

(56) References Cited

U.S. PATENT DOCUMENTS

| | | | | |
|---|---|---|---|---|
| 2004/0105261 A1* | 6/2004 | Ducharme | ............. | H05B 45/20 362/231 |
| 2007/0223219 A1* | 9/2007 | Medendorp, Jr. | ..... | C09K 11/586 362/231 |
| 2011/0222277 A1* | 9/2011 | Negley | ................. | H01L 33/504 362/235 |
| 2012/0223657 A1* | 9/2012 | Van de Ven | ........... | H05B 45/46 315/297 |
| 2012/0306370 A1* | 12/2012 | Van De Ven | .......... | H05B 45/56 315/113 |
| 2013/0162140 A1* | 6/2013 | Shamoto | ................ | H05B 45/00 315/77 |
| 2015/0284627 A1* | 10/2015 | Bohmer | ............... | C09K 11/883 362/84 |
| 2015/0312990 A1* | 10/2015 | van de Ven | ............ | H05B 45/00 315/186 |

* cited by examiner

*Primary Examiner* — Crystal L Hammond

(57) ABSTRACT

Tunable LED lighting systems, devices and methods are described herein. A light emitting device includes at least a first phosphor-converted LED configured to emit light having a desaturated orange color point characterized by CIE 1976 color coordinates $0.3<u'<0.35$ and $v'>0.52$ and at least a second phosphor-converted LED configured to emit light having a cyan color point characterized by CIE 1976 color coordinates $0.15<u'<0.20$ and $0.47<v'<0.52$. The first phosphor-converted LED and the second phosphor-converted LED are arranged to combine the light emitted by the first phosphor-converted LED with the light emitted by the second phosphor-converted LED to provide a white light output from the light emitting device.

20 Claims, 17 Drawing Sheets

COLOR TUNABLE LIGHT EMITTING DIODE (LED) SYSTEMS, LED LIGHTING SYSTEMS, AND METHODS

BACKGROUND

Correlated color temperature (CCT) tunable light emitting diode (LED) lighting systems may provide linear tuning between two primary color points in a color space using two channel LED driving and two groups of LED emitters, each group configured to emit light having one of the two primary color points when turned on. A tuning range of such LED lighting systems may be a range of CCTs between the primary color points. For example, for CCT tuning of a white LED lighting system, the two primary color points may be warm white, having a CCT of 2700K, and neutral white, having a CCT of 4000K, providing a tuning range for the LED lighting system of 2700K-4000K.

SUMMARY

Tunable LED lighting systems, devices and methods are described herein. A light emitting device includes at least a first phosphor-converted LED configured to emit light having a desaturated orange color point characterized by CIE 1976 color coordinates $0.3<u'<0.35$ and $v'>0.52$ and at least a second phosphor-converted LED configured to emit light having a cyan color point characterized by CIE 1976 color coordinates $0.15<u'<0.20$ and $0.47<v'<0.52$. The first phosphor-converted LED and the second phosphor-converted LED are arranged to combine the light emitted by the first phosphor-converted LED with the light emitted by the second phosphor-converted LED to provide a white light output from the light emitting device.

DETAILED DESCRIPTION OF THE PREFERRED EMBODIMENTS

Figure 1A:
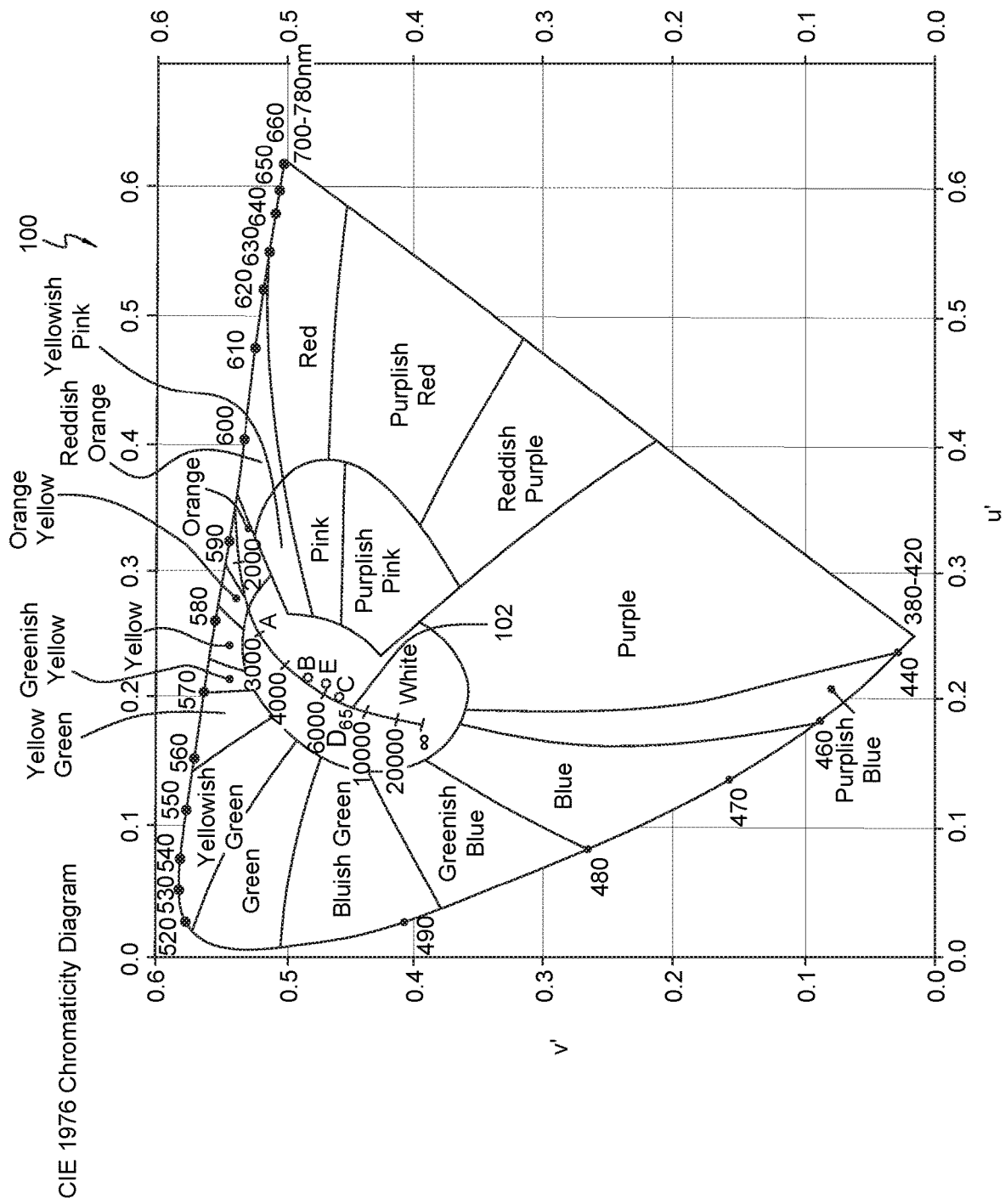
FIG. 1A is an International Commission on Illumination (CIE) 1976 chromaticity diagram representing a color space.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Further, whether LED devices, LED arrays, electrical components and/or electronic components are housed on one, two or more electronics boards may also depend on design constraints and/or application.

Semiconductor light emitting devices (LEDs) or optical power emitting devices, such as devices that emit ultraviolet (UV) or infrared (IR) optical power, are among the most efficient light sources currently available. These devices (hereinafter "LEDs"), may include light emitting diodes, resonant cavity light emitting diodes, vertical cavity laser diodes, edge emitting lasers, or the like. Due to their compact size and lower power requirements, for example, LEDs may be attractive candidates for many different applications. For example, they may be used as light sources (e.g., flash lights and camera flashes) for hand-held battery-powered devices, such as cameras and cell phones. They may also be used, for example, for automotive lighting, heads up display (HUD) lighting, horticultural lighting, street lighting, torch for video, general illumination (e.g., home, shop, office and studio lighting, theater/stage lighting and architectural lighting), augmented reality (AR) lighting, virtual reality (VR) lighting, as back lights for displays, and IR spectroscopy. A single LED may provide light that is less bright than an incandescent light source, and, therefore, multi-junction devices or arrays of LEDs (such as monolithic LED arrays, micro LED arrays, etc.) may be used for applications where more brightness is desired or required. Tunable LED lighting systems, such as described herein, may be particularly advantageous for outdoor lighting, such as street, roadway, tunnel, parking lot, parking garage, and ecologically sensitive area lighting, where it may be desirable to tune the color point of the composite light provided by the LED lighting system in order to, for example, provide a more efficient, visibly pleasing and/or safer lighting environment under different ambient lighting conditions, weather conditions, traffic conditions, etc.

A color space is a three-dimensional space where a color is defined by a set of three numbers that specify the color and brightness of a particular homogeneous visual stimulus. A chromaticity diagram represents all colors perceivable by the human eye projected onto a two-dimensional space. Chromaticity diagrams may provide high precision because the parameters are based on the spectral power distribution (SPD) of the light emitted from a colored object and are factored by sensitivity curves that have been measured for the human eye. Thus, any color may be expressed precisely in terms of its two color coordinates in a chosen chromaticity diagram.

FIG. 1A is an International Commission on Illumination (CIE) 1976 chromaticity diagram 100. The CIE 1976 color space projects directly onto the corresponding chromaticity space specified by the two chromaticity coordinates, u' and v', which are shown as the u' and v' axes in FIG. 1A. The CIE 1976 chromaticity diagram 100 ignores brightness, which may be represented by the parameter I'.

The CIE 1976 chromaticity diagram 100 includes a Planckian locus or black body locus (BBL) 102. The BBL 102 is the path or locus that the color of an incandescent black body would take in a particular chromaticity space as the blackbody temperature changes from deep red at low CCTs through orange, yellowish white, white, and finally bluish white at very high CCTs. Generally speaking, white color points not too far away from the BBL 102 are preferred for general lighting.

As mentioned above, linear color tunable LED lighting systems typically have two primary LED channels that respectively drive two groups of LED emitters that have CCTs at respective ends of a tuning range for the color tunable LED lighting system. For example, an LED lighting system that has a tuning range of 2700K to 4000K may include a first group of LED emitters having a CCT of 2700K and a second group of LED emitters having a CCT of 4000K. A color point of the composite light output from the LED lighting system may be tuned by varying the mixing ratio of power provided to the first group of LED emitters through a first channel and power provided to the second group of LED emitters through a second channel. As a result, for these linear color tuning LED lighting systems, at either end of the tuning range, one group of LED emitters will be turned completely off. In such LED lighting systems, then, utilization of the LED emitters is relatively low.

Low utilization may be disadvantageous for several reasons. For example, more LED emitters may be needed to achieve the same luminous flux as a system with higher utilization. This may drive up the cost of the LED emitters themselves as well as other system components that need to accommodate a higher number of LED emitters. For directional lighting applications, low utilization may also add to the source size that is needed to achieve a certain luminous flux, reducing the overall luminance of the LED lighting system. This may mean that beam control with given secondary optics may be reduced and/or larger secondary optics may be needed to achieve the same beam control.

Additionally, conventional white LED emitters include red and green phosphors to convert the pump light to white light. In such LED emitters, down-converted green light may be re-absorbed by red phosphors and then down-converted to red light, compounding efficiency losses of the two phosphors.

Embodiments described herein provide for two groups of LED emitters electrically coupled to receive power from two channels of one or more LED driver circuits. A first group of LED emitters may be configured to emit light having a desaturated orange color. A second group of LED emitters may be configured to emit light having a desaturated cyan color. The two channels, each electrically coupled to a respective one of the first and second groups of LED emitters may yield a maximum LED emitter utilization and luminous flux for composite light from the two groups having CTTs between 2700K and 4000K at a color rendering index (CRI) greater than 70. CCT tuning may be enabled down to approximately 2000K at lower flux and CRI. In embodiments, the first group of LED emitters may include only red nitride phosphors with a peak emission wavelength between 590 nm and 650 nm and the second group of LED emitters may include only green phosphors with a peak emission wavelength between 500 nm and 560 nm, which may reduce or eliminate interaction between red and green phosphors with respect to LED lighting systems where red and green phosphors are included within a wavelength converting layer of the same LED emitter.

Referring back to the CIE 1976 chromaticity diagram 100 of FIG. 1A, the first group of LED emitters may have a desaturated orange color point, which may be characterized by CIE 1976 chromaticity coordinates $0.30<u'<0.35$ and $v'>0.52$. The LED emitter structure for the first group may have a wavelength converting layer that may include a 2-5-8 phosphor material of the general formula $[Eu_y,Ba_d,Sr_{(1-y-d)}]_2Si_5N_8$, with $0.003<y<0.03$, $0.2<d<0.6$. The second group of LED emitters may have a desaturated cyan color point, which may be characterized by CIE 1976 chromaticity coordinates 0.15<u'<0.20 and 0.47<v'<0.52. The LED emitter structure for the second group may have a wavelength converting layer that may include a garnet phosphor of the general formula $[Ce_x,Lu_a,Y_{(1-a-x)}]_3[Ga_b,Al_{(1-b)}]_5O_{12}$, with 0.01<x<0.06, 0<a<1-x, 0<b<0.6. In some embodiments, the wavelength converting layer for LED emitters in the second group may include two or more garnet phosphor materials with different compositions that are mixed together. In embodiments, the first group of LED emitters may have wavelength converting layers that include minimal or no green-emitting phosphor materials, and the second group of LED emitters may have wavelength converting layers that include minimal or no red-emitting phosphor materials, to limit phosphor-phosphor interactions and associated efficiency losses.

Figure 1B:
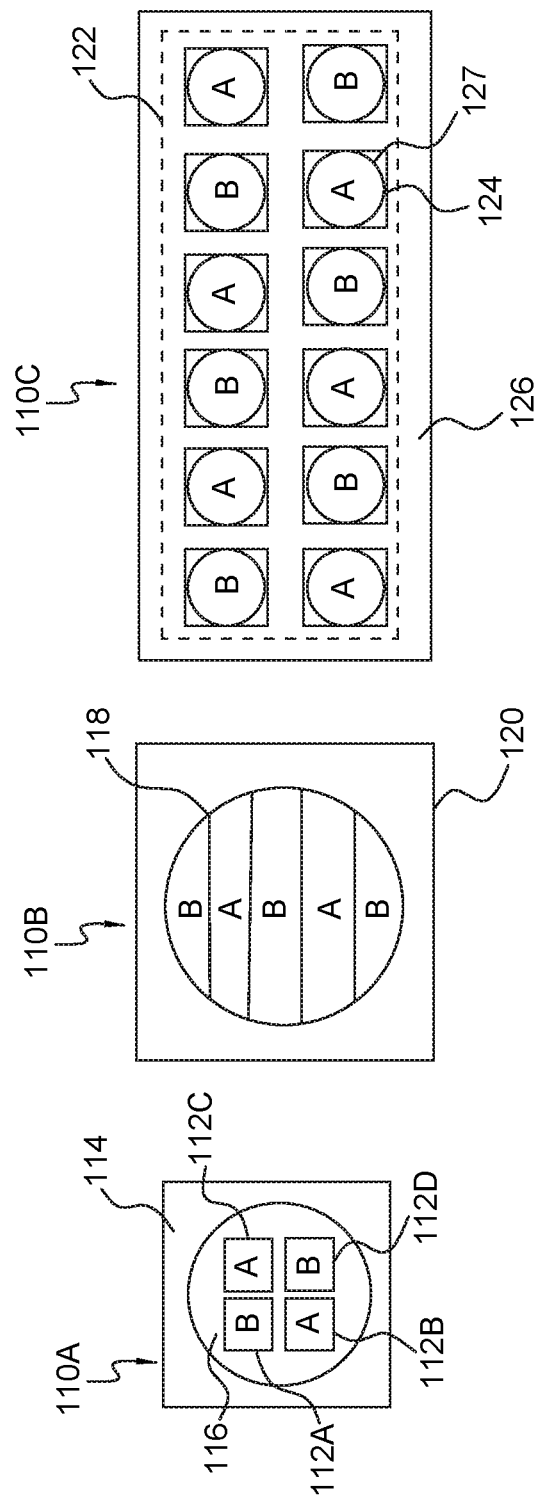
FIG. 1B is a diagram showing top views of three example LED systems that include LED emitters corresponding to a first group and a second group of LED emitters.
Figure 1C:
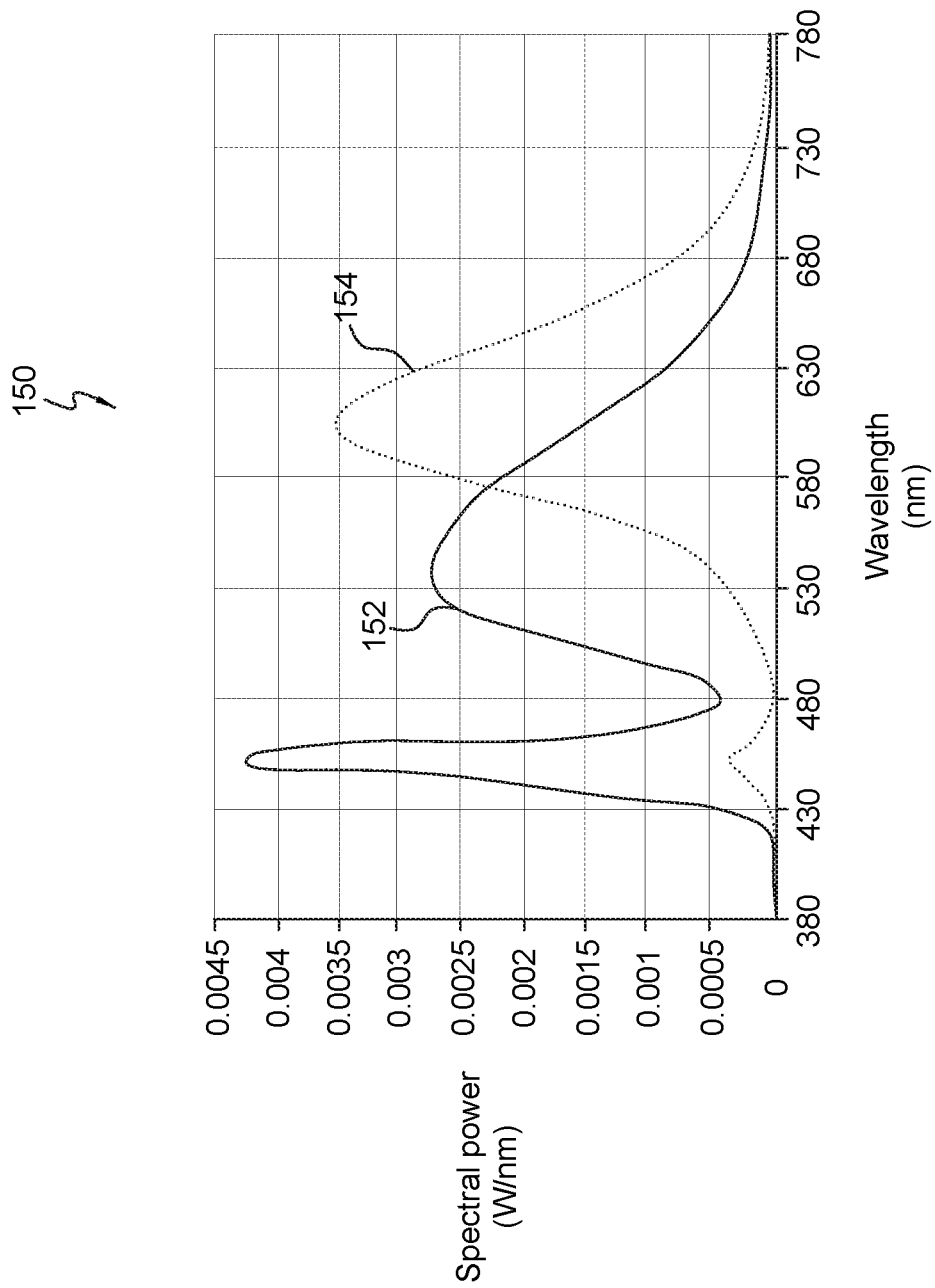
FIG. 1C is a graph showing simulated spectra for an LED emitter in the first group and an LED emitter in the second group.

FIG. 1B is a diagram showing top views of three example LED systems 110A, 110B and 110C that include LED emitters corresponding to a first group and a second group. Each of the example LED systems illustrated in FIG. 1B includes multiple LED emitters integrated at the package level or module level. While the examples illustrated in FIG. 1B are of LED systems that include arrays of LED emitters corresponding to both the first and second groups, an LED lighting system may alternatively include an array of discrete LED systems that each emit light having a single color corresponding to either the first group or the second group. Further, it will be understood that LED systems other than the specific examples described herein may be used consistent with the embodiments described herein, including, for example, a mid-power LED system. For example, an LED system 220 is illustrated in FIG. 5B, and its structure is described in detail below.

One example LED system 110A illustrated in FIG. 1B is a high-power LED system integrated on the package level. The high powered LED system 110A may include a number of LED emitters 112. In the specific example illustrated in FIG. 1B, the emitters are four distinct LED devices 112A, 112B, 112C and 112D on a substrate 114. Each of the LED devices 112A, 112B, 112C, 112D is either a desaturated orange LED device belonging to a first group A or a desaturated cyan LED device belonging to a second group B. One of ordinary skill in the art will recognize, however, that a high-powered LED system may include any number LED devices consistent with the embodiments described herein. An optional dome 116 may be provided over all of the LED devices 112 and at least portions of the substrate 114.

Another example LED system 110B illustrated in FIG. 1B is a chip-on-board (COB) LED system integrated at the package level. In the illustrated example, the COB LED system 110B includes a plurality of emitters 118 on a substrate 120. A wavelength converting layer may be patterned over the emitters 118 such that individual rows of emitters may emit light having the desaturated orange color point corresponding to group A or the desaturated cyan color point corresponding to group B, respectively. A dome (not shown) may optionally be provided over the emitters 118 and at least portions the substrate 120. While this example is described as a COB LED system 110B, in alternative embodiments, a monolithic LED array may be used and provided with a patterned wavelength converting layer similar to that shown in FIG. 1B. Further, while a striped wavelength converting layer pattern is shown in FIG. 1B, the wavelength converting layer may patterned in any manner that may enable the LED system to be electrically coupled to a two channel driver and driven such that the group A emitters emit light having the desaturated orange color point, the group B emitters emit light having the desaturated cyan color point, and the composite light output of the LED system 110B has a CCT within the desired tuning range.

Another example LED system 110C illustrated in FIG. 1B is an LED module that includes an array 122 of discrete LED systems 124 integrated at the module level. The array 122 is disposed on a substrate 126 and includes 12 discrete LED systems 124, each having a single LED device or an array of LED emitters configured to emit light having either the desaturated orange color point corresponding to group A or the desaturated cyan color point corresponding to group B when turned on. Each LED system 124 may optionally include its own optics, such as a dome 127. While twelve discrete LED systems 124 are included in the LED array 122 in FIG. 1B, it will be understood that any number of LED systems may be included depending on design constraints.

The first and second groups of LED emitters may be electrically coupled to a driver via separate channels that may separately control the drive current and/or duty cycle provided to each of the first and second groups in order to provide a composite output light having a particular CCT and luminous flux. An LED lighting system may include color tuning circuitry, such as a current division circuit, a current switching circuit, and a pulse width modulation (PWM) circuit, to generate and control current provided via each of the channels either continuously or in a pulse width modulated pattern. The driver and/or color tuning circuitry may be electrically and/or communicatively coupled to a control unit, such as the LED lighting system microcontroller, which may retrieve data from a discrete storage unit, receive inputs from one or more sensors and/or timers, and/or receive control commands from external devices via a wired or wireless receiver. The control unit may control the color tuning circuitry to set a target CCT and flux for the LED lighting system based on one or more received inputs. Examples of LED lighting systems that may include the driver, control unit, sensors and wireless and/or wired receivers in which LED systems described herein may be incorporated are described below with respect to FIGS. 2, 3A, 3B, 3C, 3D and 3E and, therefore, description of these LED lighting system components, and operation of the LED lighting systems described herein, is provided in more detail below with respect to those Figures.

As mentioned above, in an outdoor LED lighting system incorporating the first and second groups of LED emitters as described herein, design constraints may be set such that a high and constant luminous flux is provided over the 2700K to 4000K range while also achieving a CRI greater than 70 over this range and allowing tuning down to 2000K where a lower luminous flux and CRI may be acceptable.

FIG. 10 is a graph 150 showing simulated spectra for an LED emitter in the first group and an LED emitter in the second group. In the graph 150, the curve 152 represents the spectrum of an example desaturated cyan LED emitter in the second group, and the curve 154 represents the spectrum of an example desaturated orange LED emitter in the first group. The graph 150 shows the spectral power in W/nm for each of the two LED emitter types at wavelengths between 380 nm and 780 nm.

Figure 1D:
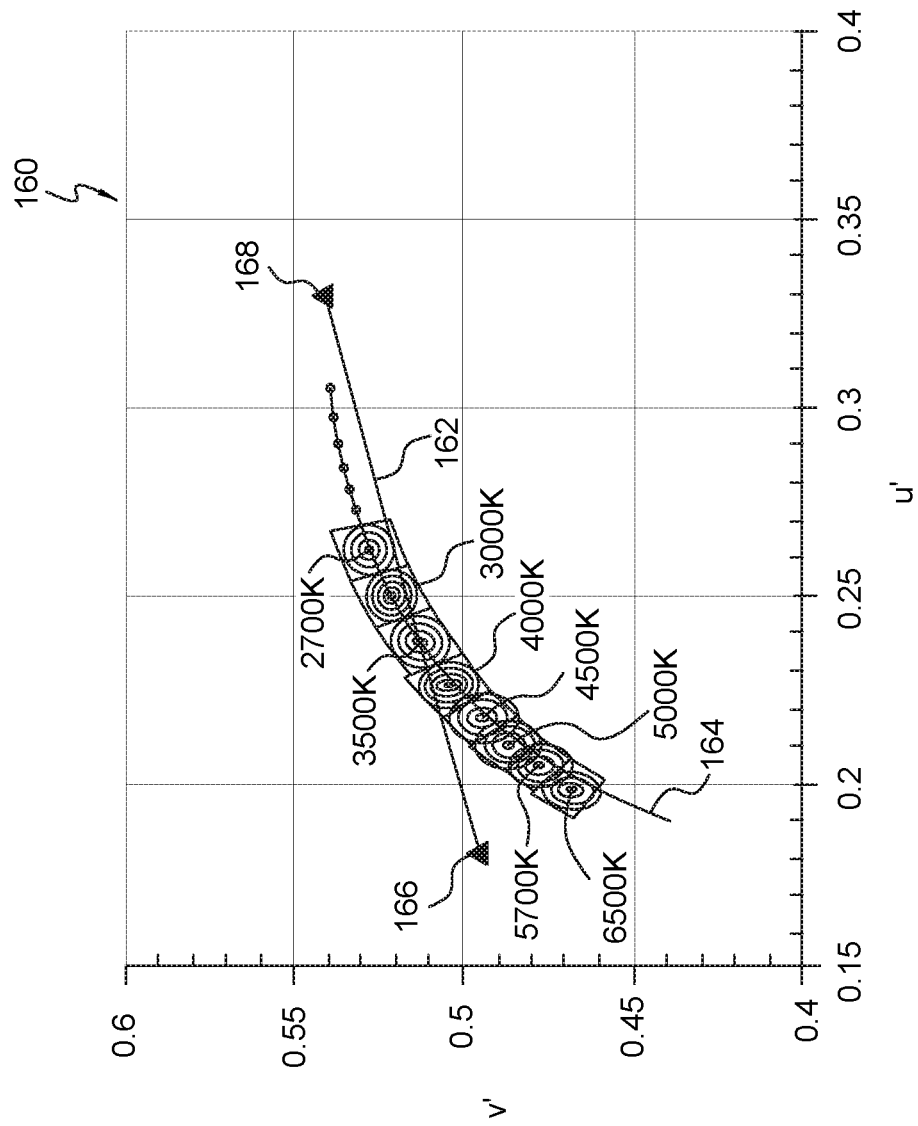
FIG. 1D is a graph showing a tuning path between an example desaturated orange color point and an example desaturated cyan color point that may correspond to light emitted by LED emitters in the first group and the second group, respectively.

FIG. 1D is a graph 160 showing a tuning path 162 between an example desaturated orange color point 166 and an example desaturated cyan color point 168 that may correspond to light emitted by LED emitters in the first group and the second group, respectively. The curve 164 represents the BBL, and the graph 160 shows different CCTs with respect to the BBL 164. As can be seen, the tuning range represented by the tuning path 162 crosses the BBL at 3500K and is within relatively close proximity to the BBL 164 between approximately 2000K and 4000K.

In embodiments, the luminous flux of the LED emitters may be estimated by scaling the luminous flux of similar LED emitters (i.e., at similar color points and using similar phosphors) by the luminous efficacy of radiation contained in the spectrum. This may enable a basic comparison of the performance of the LED lighting systems described herein with state of the art CCT tunable LED lighting systems that have primaries on the BBL 164.

Figure 1E:
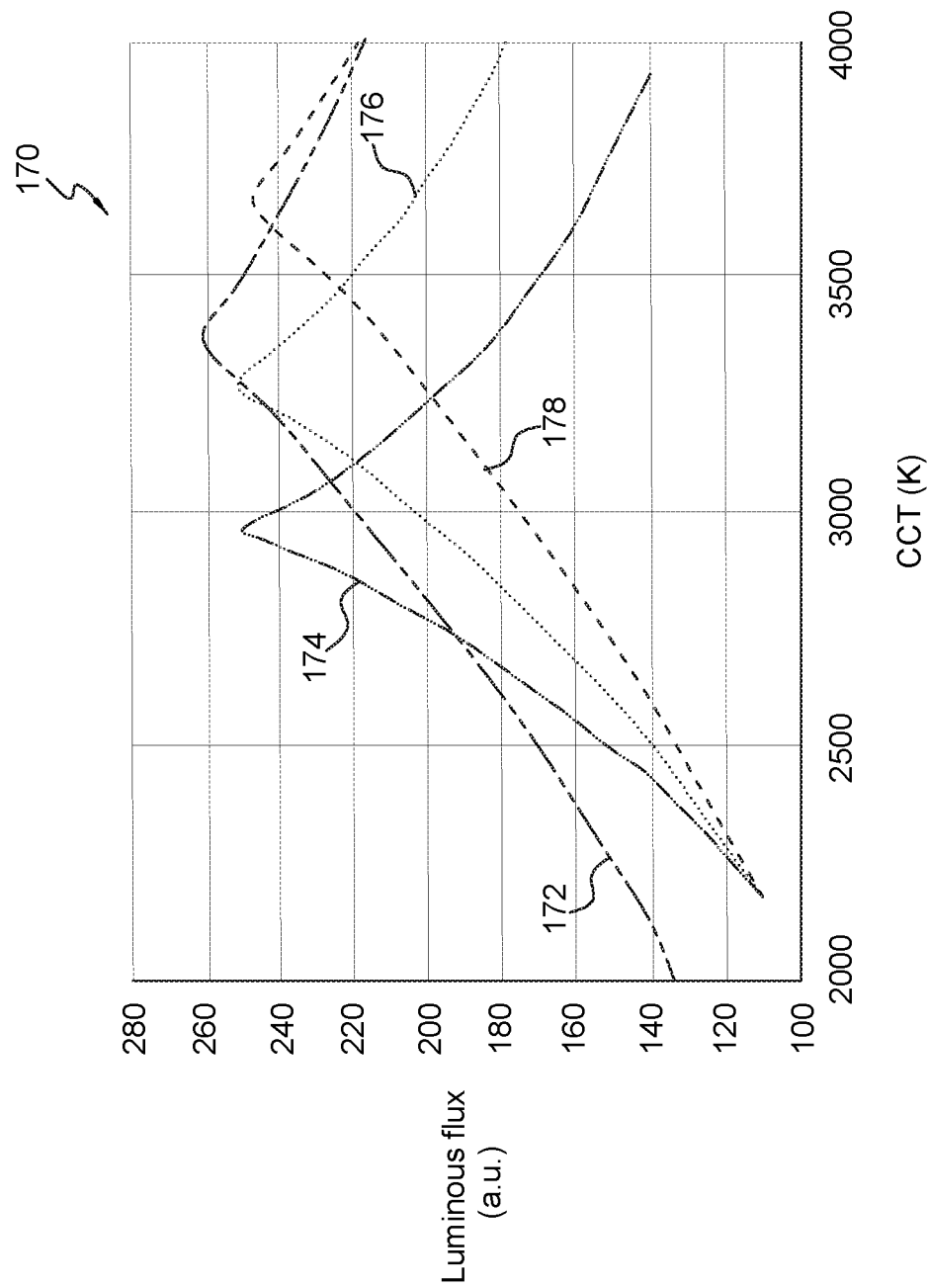
FIG. 1E is a graph showing a comparison between luminous flux at various CCTs for an embodiment of a color tunable LED lighting system as described herein and three reference tunable LED lighting systems.

FIG. 1E is a graph 170 showing a comparison between the luminous flux at various CCTs between an embodiment of a color tunable LED lighting system as described herein (172) and three reference color tunable LED lighting systems: 2200-4000K (174), 2200-5000K (176) and 2200-6500K (178). While the maximum flux that can be obtained from the color tunable LED lighting systems described herein may be only marginally higher than those of the reference color tunable LED lighting systems, the constant flux that can be maintained over the target range of 2700-4000K is significantly higher due to the higher LED utilization in the systems described herein.

Table 1 below shows this constant flux level for the LED lighting systems described herein and the reference LED lighting systems. A 17% gain is estimated from this calculation. The gain becomes 21% when considering constant flux over the CCT range from 3000-4000K. This may provide a major advantage in many outdoor applications as the gain may be utilized to reduce LED device or emitter count and fixture size while achieving the same flux, improving optical control without changing the optical system, and/or driving the LEDs at a lower drive condition to improve efficacy.

TABLE 1

| | Constant flux over 2700-4000K | Constant flux over 3000-4000K |
| --- | --- | --- |
| Systems described herein | 188 | 216 |
| Reference system 2200-4000K | 140 | 140 |
| Reference system 2200-5000K | 161 | 178 |
| Reference system 2200-6500K | 149 | 175 |

Figure 1F:
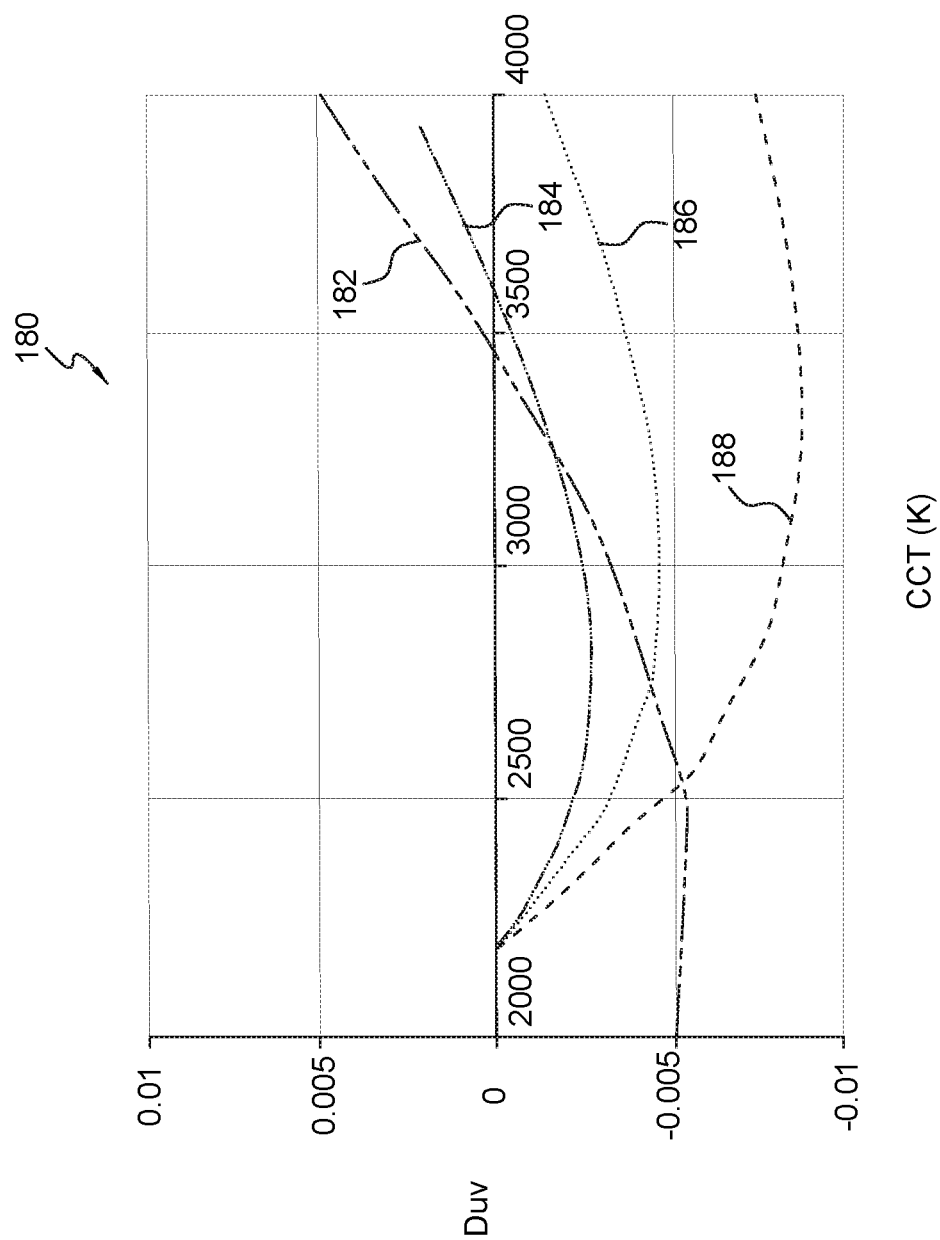
FIG. 1F is a graph showing the distance between the tuning path of FIG. 1D and the black body line (BBL) for an embodiment of a color tunable LED lighting system as described herein and the reference color tunable LED lighting systems.

FIG. 1F is a graph 170 showing the distance of the tuning path from the BBL (represented by Duv) for an embodiment of a tunable LED lighting system as described herein (182) and the reference LED lighting systems tunable over 2200K to 4000K (184), 2200K to 5000K (186), and 2200K to 6500K (188). By definition, the reference LED lighting systems that utilize on-BBL white primaries have tuning paths that fall below the BBL, with the 2200-6500K reference LED lighting system reaching a Duv of −0.009. In the LED lighting systems described herein, the tuning path crosses the BBL around 3500K, with Duv down to about −0.005 at lower CCTs and Duv up to about +0.005 at higher CCTs. This corresponds qualitatively to white point preferences observed in various studies (e.g., Ohno et al., Rea et al.) and is, therefore, not expected to be objectionable and may potentially even be preferable compared to a Planckian tuning path.

Figure 1G:
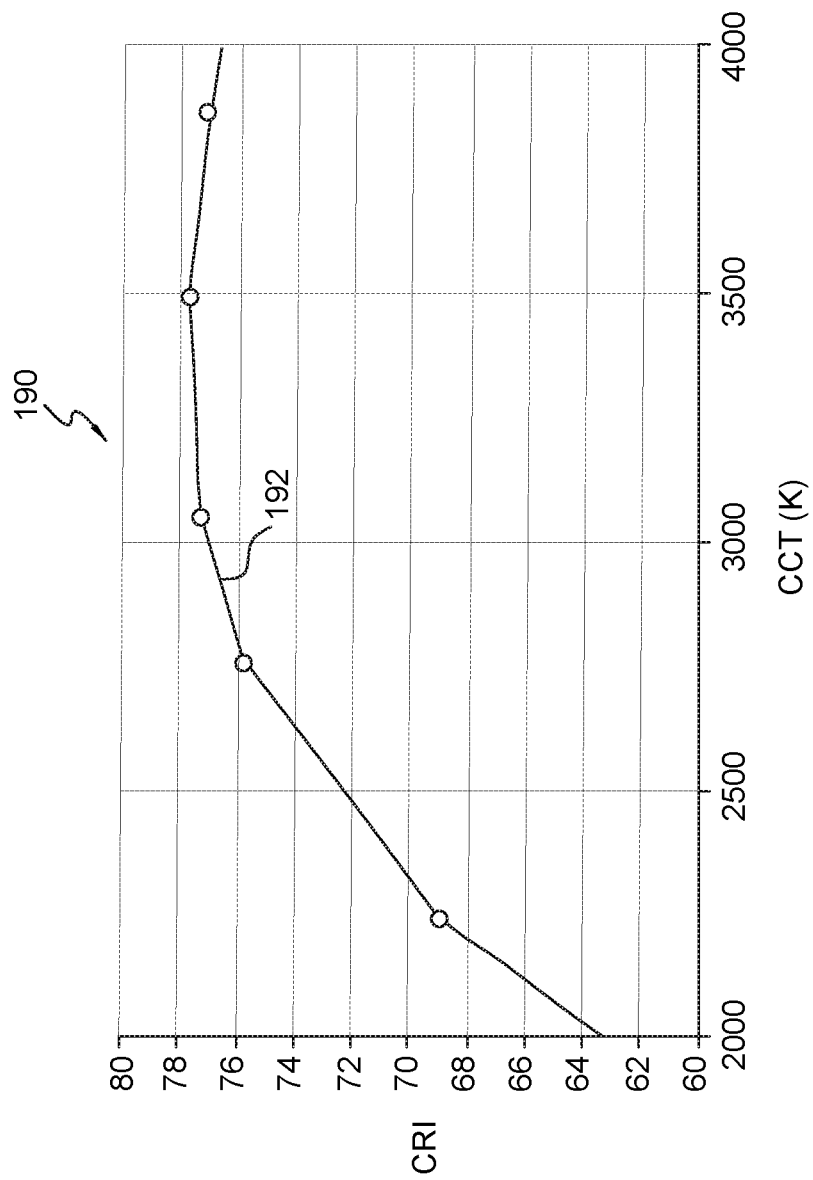
FIG. 1G is a graph showing the calculated color rendering index (CRI) as a function of CCT for an embodiment of a color tunable LED lighting system as described herein.

FIG. 1G is a graph 190 showing the calculated CRI of the composite light output from an LED lighting system that includes one or more LED emitters made substantially with a 2-5-8 nitride phosphor and one or more LED emitters made substantially with a garnet phosphor. Both groups, individually, output light having a CRI below 70. As shown by the line 192 in FIG. 1G, however, the mixed spectrum has a CRI well above 70 for the 2700-4000K range with maximum flux operation and CRI still above 60 for the 2000-2700K operating range.

Figure 1H:
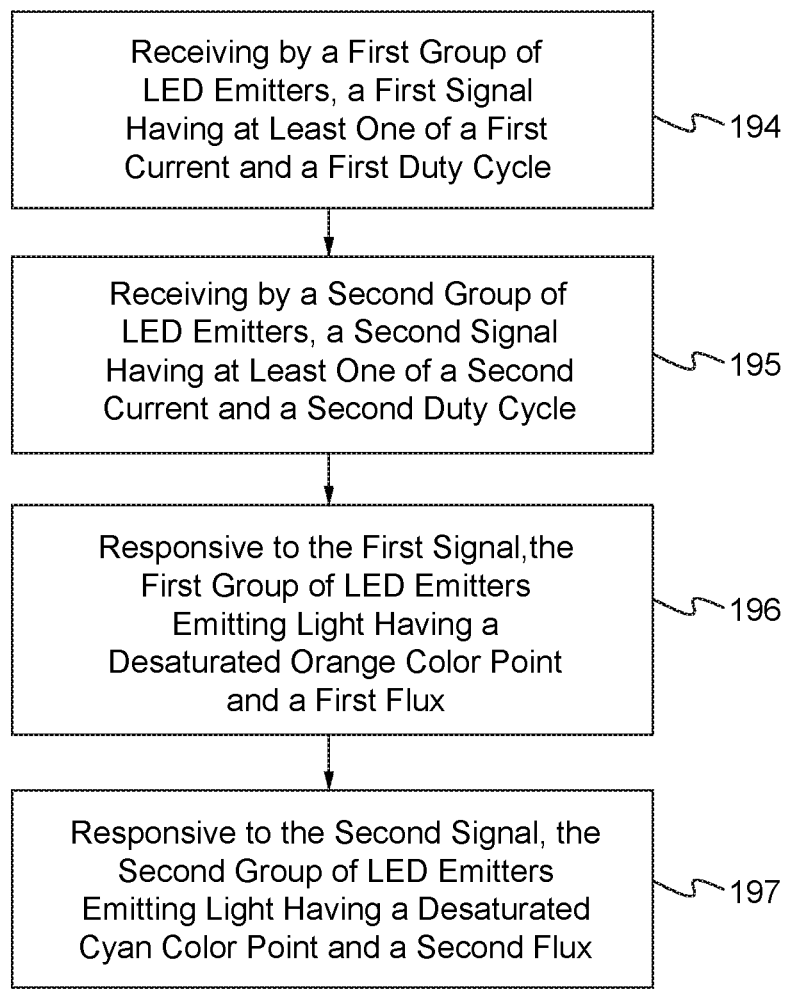
FIG. 1H is a flow diagram of an example method of operating a color tunable LED lighting system as described herein.

FIG. 1H is a flow diagram 193 of an example method of operating an LED lighting system according to embodiments described herein. In the example illustrated in FIG. 1H, a first group of LED emitters receives a first signal having at least one of a first current and a first duty cycle (194). A second group of LED emitters may receive a second signal having at least one of a second current and a second duty cycle (195). Responsive to the first signal, the first group of LED emitters may emit light having a desaturated orange color point and a first flux (196). Responsive to the second signal, the second group of LED emitters may emit light having a desaturated cyan color point and a second flux (198). While specific steps are illustrated in FIG. 1H, one of ordinary skill in the art will understand that more or less steps may be included. Additionally, any of the steps may be combined to be performed at the same time. The order of the steps may also be altered such that any one or more of the steps are performed in a different sequence.

Figure 2:
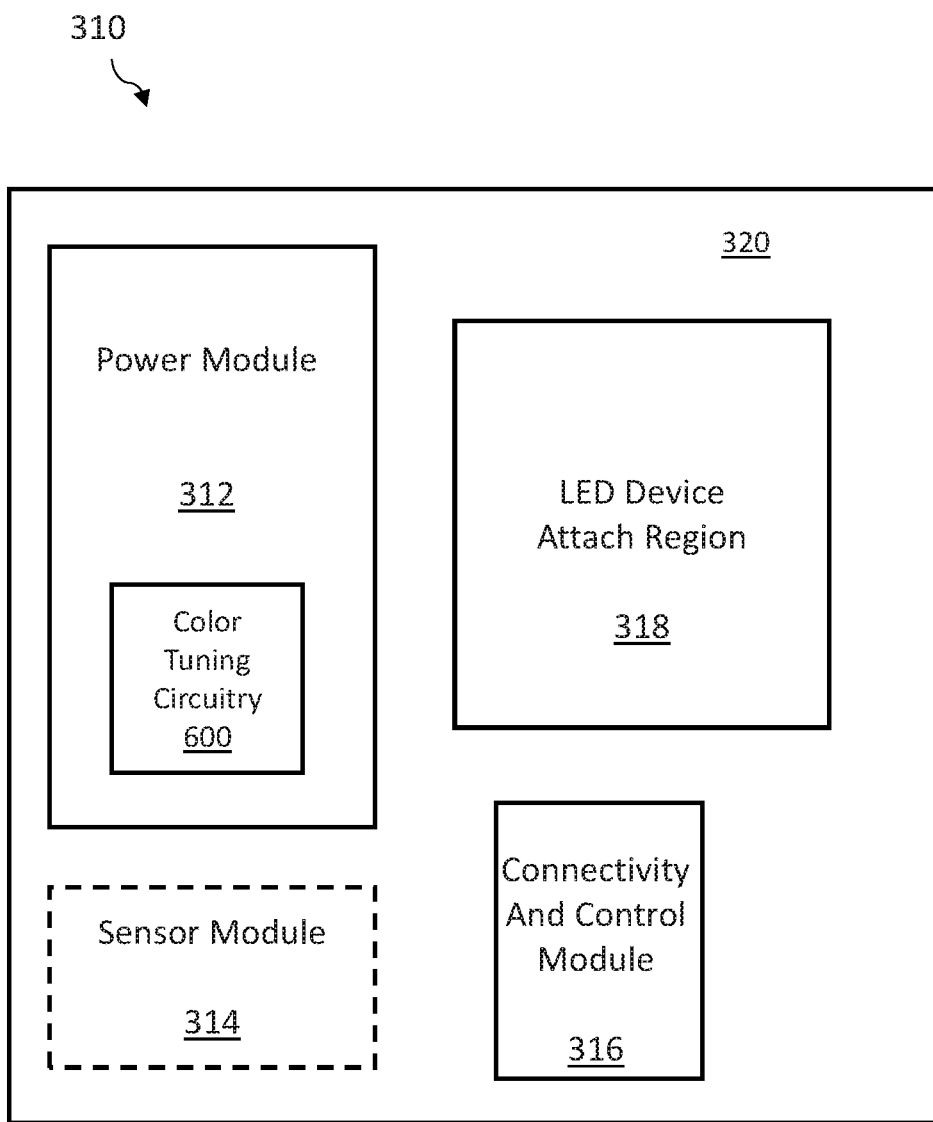
FIG. 2 is a top view of an electronics board for an integrated LED lighting system according to one embodiment.

FIG. 2 is a top view of an electronics board 310 for an integrated LED lighting system according to one embodiment. In alternative embodiments, two or more electronics boards may be used for the LED lighting system. For example, the LED array may be on a separate electronics board, or the sensor module may be on a separate electronics board. In the illustrated example, the electronics board 310 includes a power module 312, a sensor module 314, a connectivity and control module 316 and an LED attach region 318 reserved for attachment of an LED array, or individual LED system(s) 110 as described in detail above, on a substrate 320.

The substrate 320 may be any board capable of mechanically supporting, and providing electrical coupling to, electrical components, electronic components and/or electronic modules using conductive connecters, such as tracks, traces, pads, vias, and/or wires. The substrate 320 may include one or more metallization layers disposed between, or on, one or more layers of non-conductive material, such as a dielectric composite material. The power module 312 may include electrical and/or electronic elements. In an example embodiment, the power module 312 includes an AC/DC conversion circuit, a dimming circuit, an LED driver circuit, and color tuning circuitry 600. The LED driver circuit may include, for example, a DC/DC conversion circuit and other required or desired voltage rectifier circuits. The color tuning circuitry 600 may be configured to vary the mixing ratio of power provided to the first and second groups of LED emitters to control the CCT of composite light output by LED emitters, according to the embodiments described herein, which may be attached to the LED device attach region 318 in other embodiments.

The sensor module 314 may include sensors needed for an application in which LED devices, systems or arrays are to be implemented. Example sensors may include optical sensors (e.g., IR sensors and image sensors), motion sensors, thermal sensors, mechanical sensors, proximity sensors, or even timers. By way of example, LED lighting systems, such as described herein, may be turned off/on and/or CCT tuned based on a number of different sensor inputs, such as a detected presence of a user, detected ambient lighting conditions, detected weather conditions, or based on time of day/night. This may include, for example, adjusting the intensity of light output, the shape of light output, and/or the CCT of light output, and/or turning the LED devices, systems or emitters on or off to conserve energy. The motion sensors themselves may be LEDs, such as IR detector LEDs. In alternative embodiments, the electronics board 310 does not include a sensor module, but sensors or sensor modules may be provided on a separate electronics board (not shown) or in other off board locations.

The connectivity and control module 316 may include the system microcontroller and any type of wired or wireless module configured to receive a control input from an external device. By way of example, a wireless module may include Bluetooth, Zigbee, Z-wave, mesh, WiFi, near field communication (NFC) and/or peer to peer modules. The microcontroller may be any type of special purpose computer or processor that may be embedded in an LED lighting system and configured or configurable to receive inputs from the wired or wireless module or other modules in the LED lighting system (such as sensor data and data fed back from the LED module) and provide control signals to other modules based thereon. Algorithms implemented by the special purpose processor may be implemented in a computer program, software, or firmware incorporated in a non-transitory computer-readable storage medium for execution by the special purpose processor. Examples of non-transitory computer-readable storage mediums include a read only memory (ROM), a random access memory (RAM), a register, cache memory, and semiconductor memory devices. The memory may be included as part of the microcontroller or may be implemented elsewhere, either on or off the electronics board 310. In embodiments described herein, LED lighting systems, such as described herein, may be turned off/on and/or CCT tuned based on user input via the wired or wireless module. For example, a user may desire lighting that has a particular CCT and may provide the desired CCT or similar input to the wired or wireless module via a user input device, such as a mobile phone or computer. In other embodiments, a user may enter an input that may be used in conjunction with sensor data to turn the LED lighting system off/on and/or tune the CCT of the LED lighting system.

The term module, as used herein, may refer to electrical and/or electronic components disposed on individual circuit boards that may be soldered to one or more electronics boards 310. The term module may, however, also refer to electrical and/or electronic components that provide similar functionality, but which may be individually soldered to one or more circuit boards in a same region or in different regions.

Figure 3A:
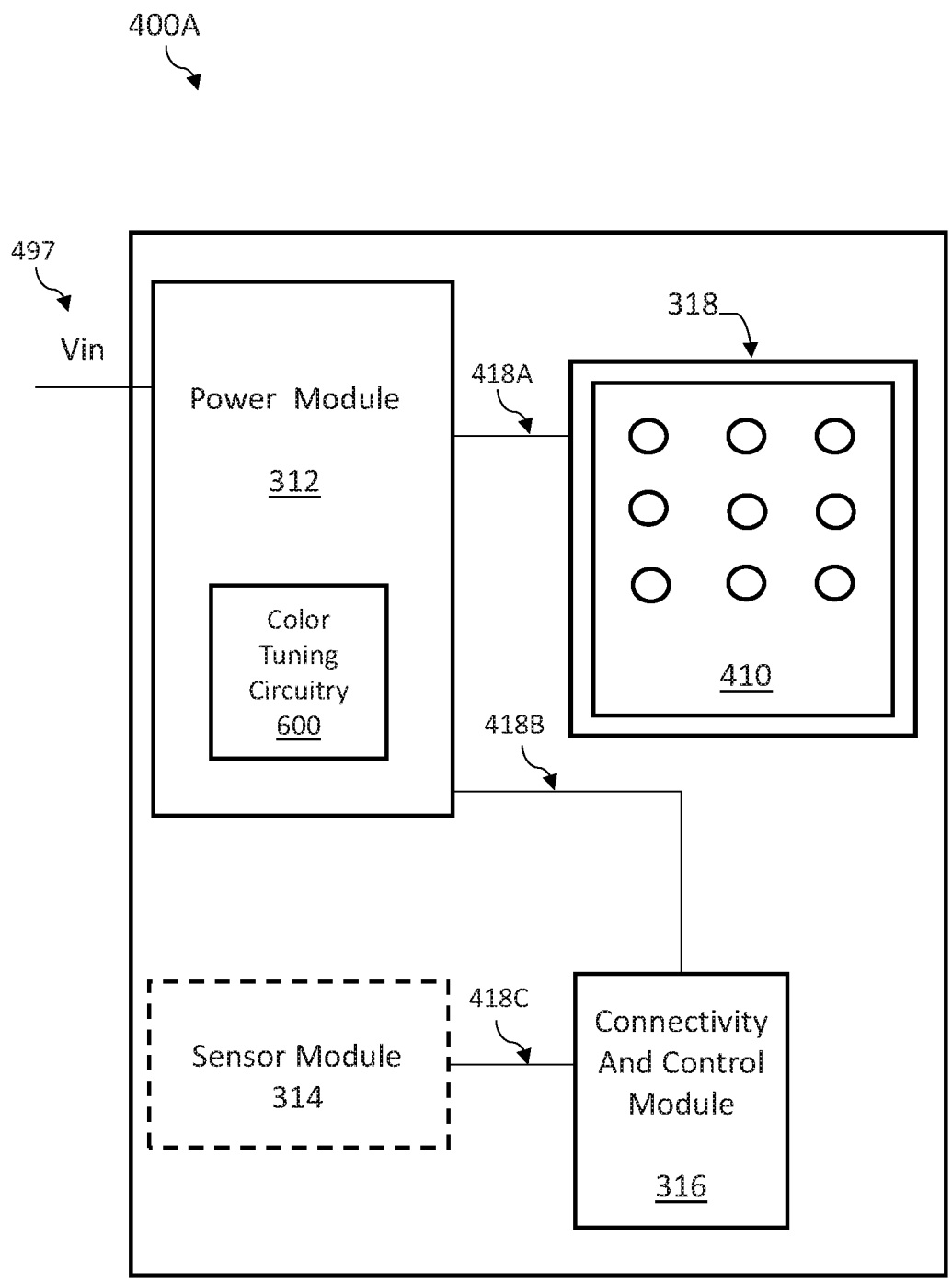
FIG. 3A is a top view of the electronics board with LED array attached to the substrate at the LED device attach region in one embodiment.

FIG. 3A is a top view of the electronics board 310 with an LED array 410 attached to the substrate 320 at the LED device attach region 318 in one embodiment. The electronics board 310 together with the LED array 410 represents an LED lighting system 400A. Additionally, the power module 312 receives a voltage input at Vin 497 and control signals from the connectivity and control module 316 over traces 418B, and provides drive signals to the LED array 410 over traces 418A. The LED array 410 is turned on and off via the drive signals from the power module 312, which may include color tuning circuitry 600, as described herein. In the embodiment shown in FIG. 3A, the connectivity and control module 316 receives sensor signals from the sensor module 314 over traces 418O. The LED array 410 may include the first group of LED emitters and the second group of LED emitters as described herein.

Figure 3B:
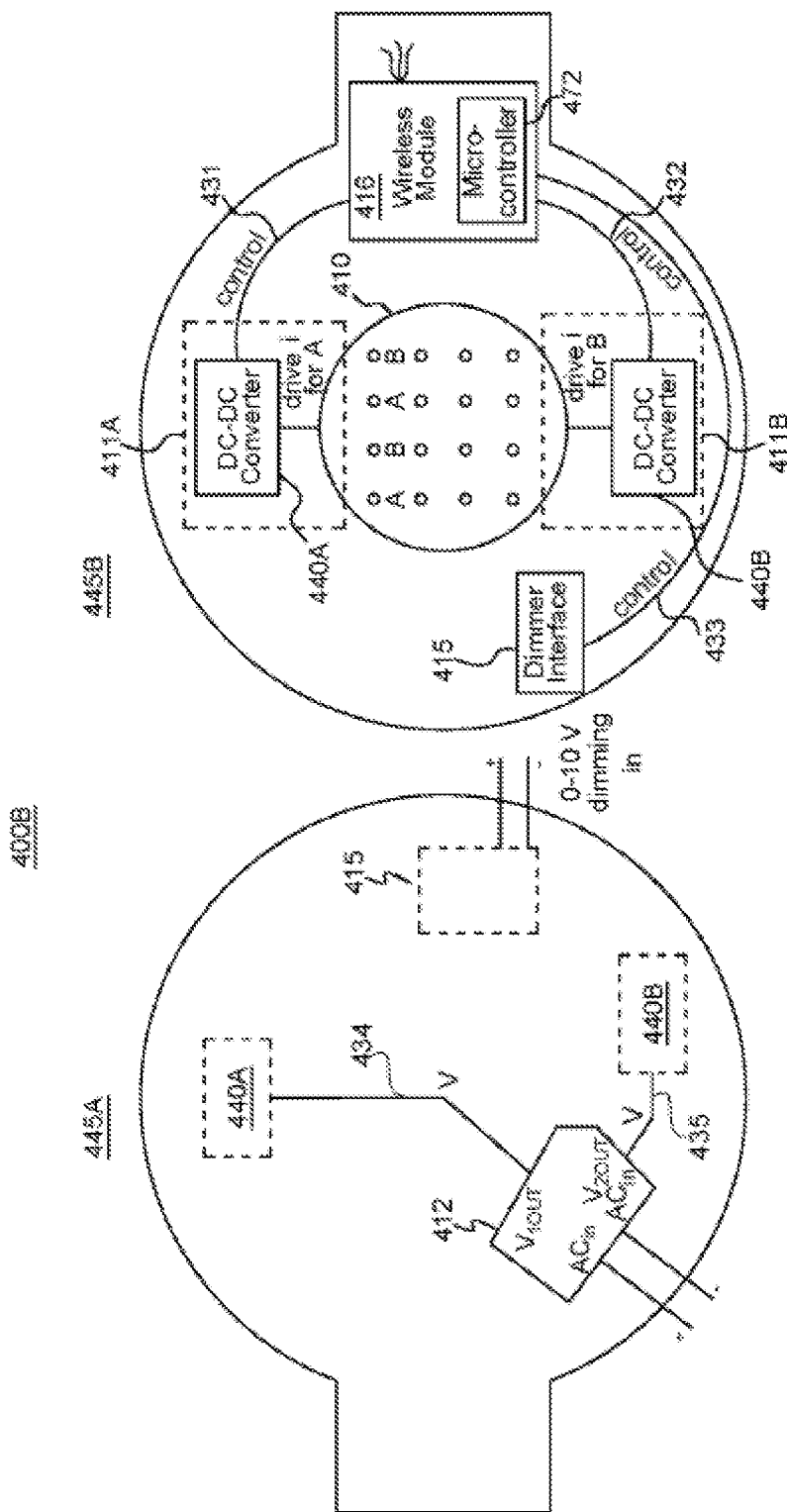
FIG. 3B is a diagram of one embodiment of a two channel integrated LED lighting system with electronic components mounted on two surfaces of a circuit board.

FIG. 3B illustrates one embodiment of a two channel integrated LED lighting system with electronic components mounted on two surfaces of a circuit board 499. As shown in FIG. 3B, an LED lighting system 400B includes a first surface 445A having inputs to receive dimmer signals and AC power signals and an AC/DC converter circuit 412 mounted on it. The LED system 400B includes a second surface 445B with the dimmer interface circuit 415, DC-DC converter circuits 440A and 440B, a connectivity and control module 416 (a wireless module in this example) having a microcontroller 472 and an LED array 410 mounted on it. The LED array 410 is driven by two independent channels 411A and 411B. In alternative embodiments, a single channel may be used to provide the drive signals to an LED array, or any number of multiple channels may be used to provide the drive signals to an LED array. For example, FIG. 3E illustrates an LED lighting system 400D having 3 channels and is described in further detail below. Although not shown in FIG. 3B, the DC-DC converter circuits 440A and 440B can each be a part of an independent single channel driver that may include color tuning circuitry (not shown).

The LED array 410 may include two groups of LED emitters, which may be the first and second groups of LED emitters described herein. In an example embodiment, the LED emitters of group A are electrically coupled to a first channel 411A and the LED emitters of group B are electrically coupled to a second channel 411B. Each of the two DC-DC converters 440A and 440B may provide a respective drive current via single channels 411A and 411B, respectively, for driving a respective group of LED emitters A and B in the LED array 410. The LED emitters in one of the groups may be configured to emit light having a different color point than the LED emitters in the second group. In embodiments, the first and second groups A and B may have a desaturated orange color point and a desaturated cyan color point, respectively, as described above. Control of the composite color point of light emitted by the LED array 410 may be tuned within a range by controlling the current and/or duty cycle applied by the individual DC-DC converter circuits 440A and 440B via a single channel 411A and 411B, respectively. This may be performed using the color tuning circuitry (not shown). Although the embodiment shown n FIG. 3B does not include a sensor module (as described in FIG. 2 and FIG. 3A), an alternative embodiment may include a sensor module.

The illustrated LED lighting system 400B is an integrated system in which the LED array 410 and the circuitry for operating the LED array 410 are provided on a single electronics board. Connections between modules on the same surface of the circuit board 499 may be electrically coupled for exchanging, for example, voltages, currents, and control signals between modules, by surface or sub-surface interconnections, such as traces 431, 432, 433, 434 and 435 or metallizations (not shown). Connections between modules on opposite surfaces of the circuit board 499 may be electrically coupled by through board interconnections, such as vias and metallizations (not shown).

Figure 3C:
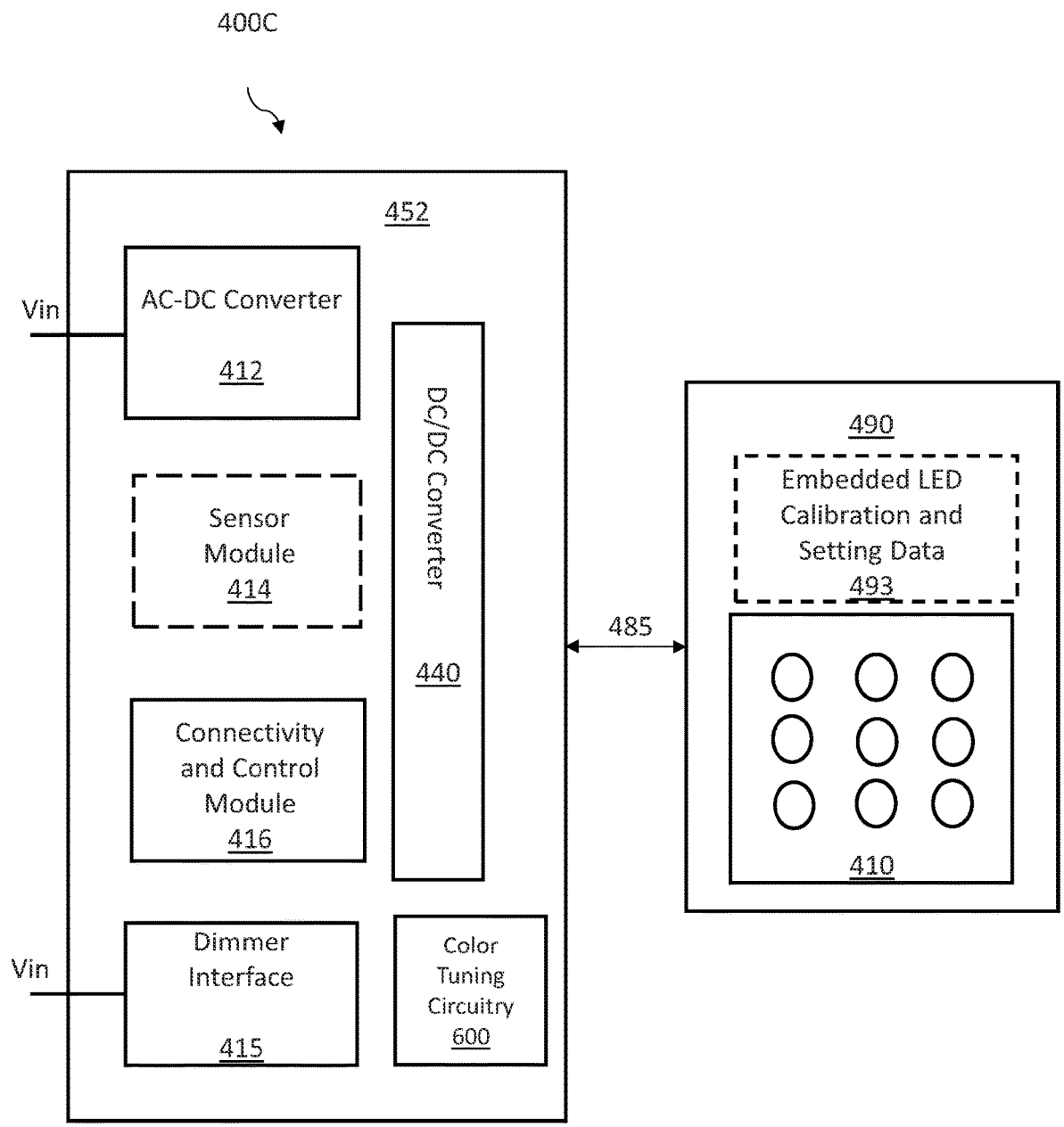
FIG. 3C is a diagram of an embodiment of an LED lighting system where the LED array is on a separate electronics board from the driver and control circuitry.

FIG. 3C illustrates an embodiment of an LED lighting system 400C where the LED array is on a separate electronics board from the driver and control circuitry. The LED lighting system 400C includes a power module 452 that is on a separate electronics board than an LED module 490. The power module 452 may include, on a first electronics board, an AC/DC converter circuit 412, a sensor module 414, a connectivity and control module 416, a dimmer interface circuit 415, a DC-DC converter 440 and color tuning circuitry 600. The LED module 490 may include, on a second electronics board, embedded LED calibration and setting data 493 and the LED array 410. Data, control signals and/or LED driver input signals 485 may be exchanged between the power module 452 and the LED module 490 via wires that may electrically and communicatively couple the two modules.

The embedded LED calibration and setting data 493 may include any data needed by other modules within a given LED lighting system to control how the LEDs in the LED array are driven. In one embodiment, the embedded calibration and setting data 493 may include data needed by the microcontroller to generate or modify a control signal that instructs the driver to provide power to each group of LEDs A and B using, for example, pulse width modulated (PWM) signals. In this example, the calibration and setting data 493 may inform the microcontroller (not shown) as to, for example, the number of power channels to be used, a desired color point of the composite light to be provided by the entire LED array 410, and/or a percentage of the power provided by the AC/DC converter circuit 412 to provide to each channel.

Figure 3D:
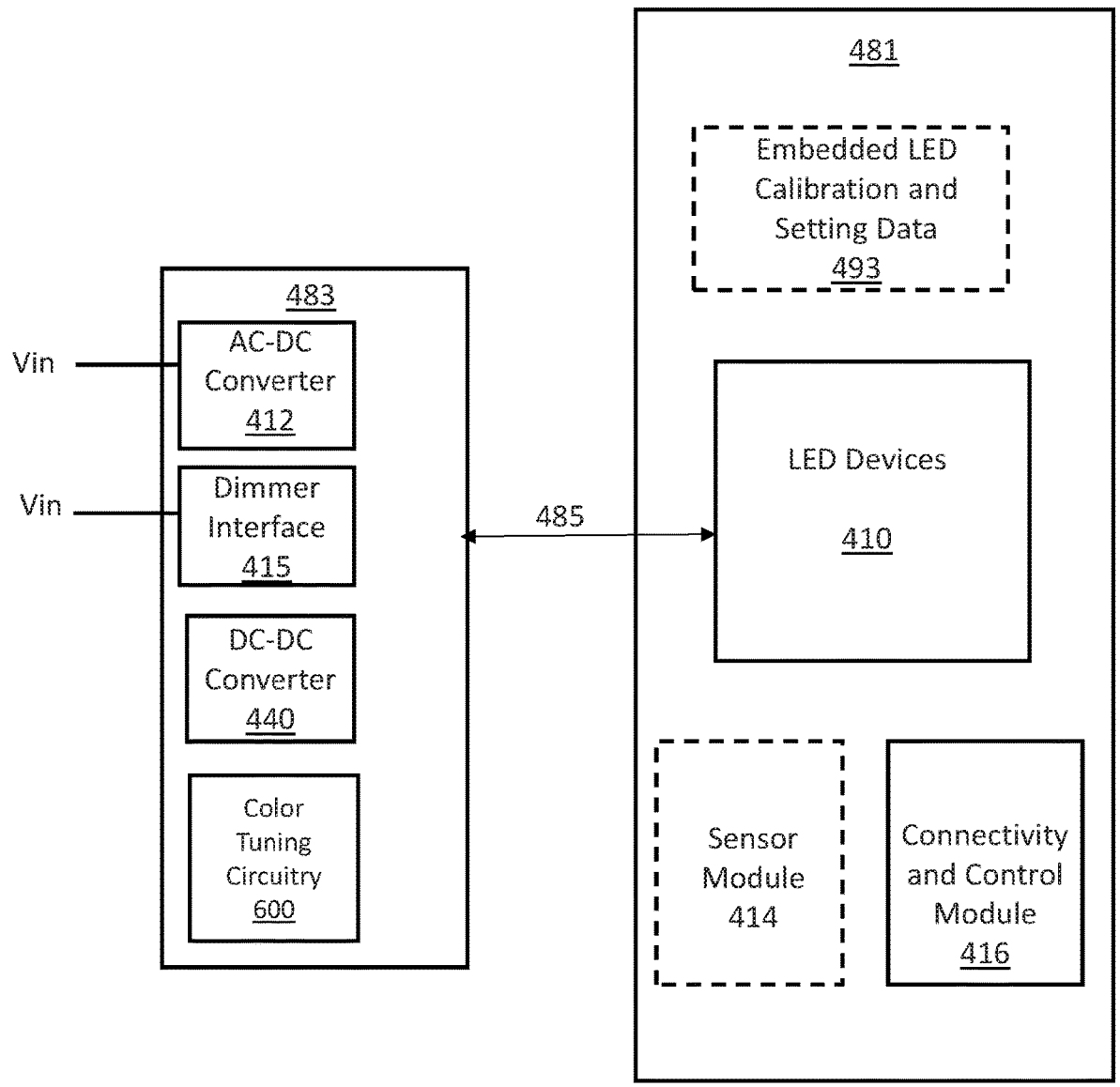
FIG. 3D is a block diagram of an LED lighting system having the LED array together with some of the electronics on an electronics board separate from the driver circuit.
Figure 3E:
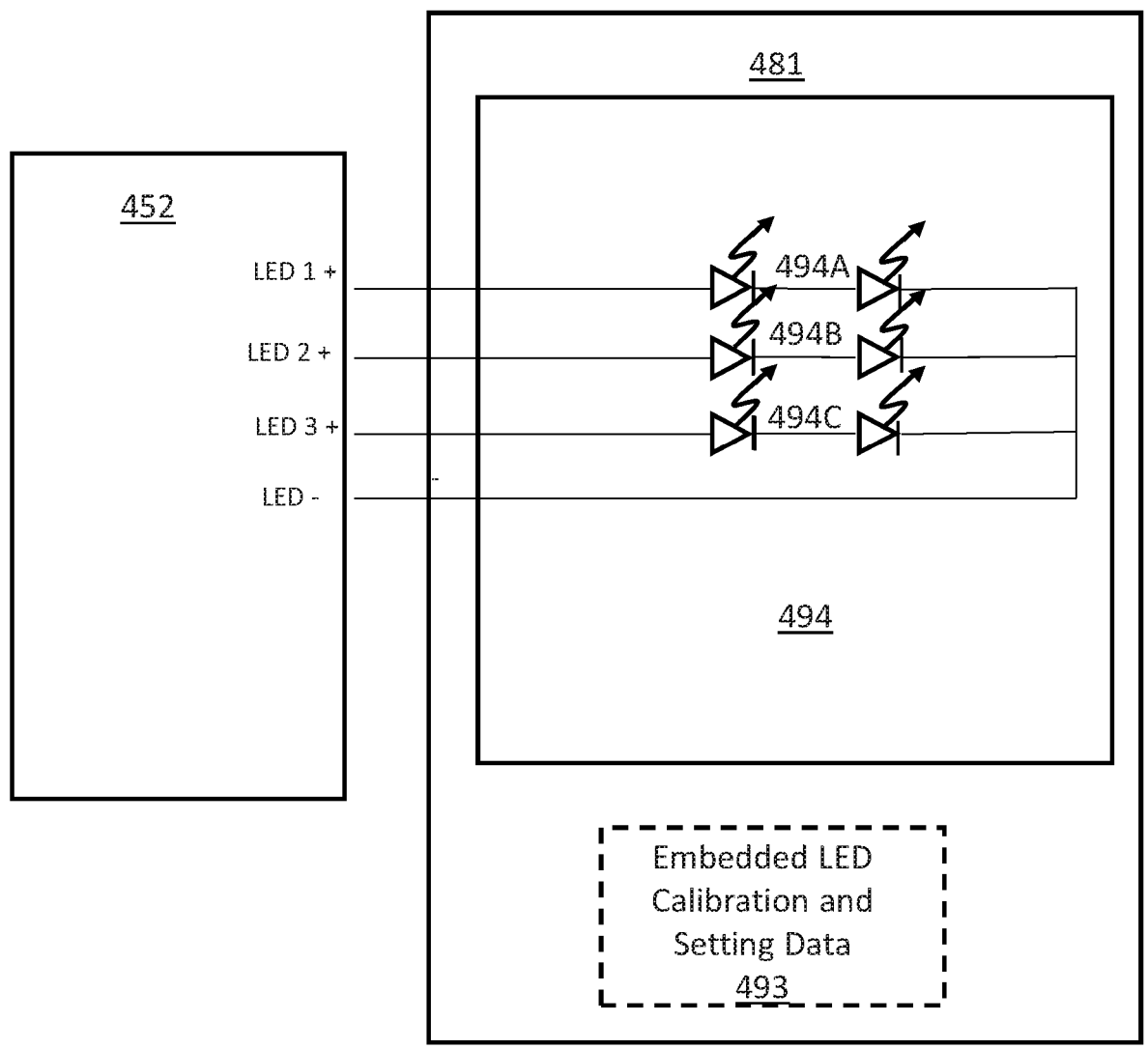
FIG. 3E is a diagram of example LED lighting system showing a multi-channel LED driver circuit.

FIG. 3D illustrates a block diagram of an LED lighting system 400D having the LED array together with some of the electronics on an electronics board separate from the driver circuit. An LED system 400D includes a power conversion module 483 and an LED module 481 located on a separate electronics board. The power conversion module 483 may include the AC/DC converter circuit 412, the dimmer interface circuit 415, the DC-DC converter circuit 440 and the color tuning circuitry 600, and the LED module 481 may include the embedded LED calibration and setting data 493, LED array 410, sensor module 414 and connectivity and control module 416. The power conversion module 483 may provide LED driver input signals 485 to the LED array 410 via a wired connection between the two electronics boards.

FIG. 3E is a diagram of an example LED lighting system 400E showing a multi-channel LED driver circuit. In the illustrated example, the LED lighting system 400E includes a power module 452 and an LED module 481 that includes the embedded LED calibration and setting data 493 and three groups of LED emitters 494A, 494B and 494C. While three groups of LED emitters are shown in FIG. 3E, one of ordinary skill in the art will recognize that any number of groups of LED emitters may be used consistent with the embodiments described herein. Further, while the individual LED emitters within each group are arranged in series, they may be arranged in parallel in some embodiments.

The LED array 494 may include groups of LED emitters that provide light having different color points. For example, the LED array 494 may include a warm white light source via a first group of LED emitters 494A, a cool white light source via a second group of LED emitters 494B and a neutral while light source via a third group of LED emitters 494C. The warm white light source via the first group of LED emitters 494A may include one or more LED emitters that are configured to provide white light having a correlated color temperature (CCT) of approximately 2700K. The cool white light source via the second group of LED emitters 494B may include one or more LED emitters that are configured to provide white light having a CCT of approximately 6500K. The neutral white light source via the third group of LED emitters 494C may include one or more LED emitters configured to provide light having a CCT of approximately 4000K. While various white colored LED emitters are described in this example, one of ordinary skill in the art will recognize that other color combinations are possible consistent with the embodiments described herein to provide a composite light output from the LED array 494 that has various overall colors.

The power module 452 may include color tuning circuitry (not shown), which may be configured to supply power to the LED array 494 over three separate channels (indicated as LED1+, LED2+ and LED3+ in FIG. 3E). More particularly, the color tuning circuitry may be configured to supply a first PWM signal to the first group of LED emitters 494A such as a warm white light source via a first channel, a second PWM signal to the second group of LED emitters 494B via a second channel, and a third PWM signal to the third group of LED emitters 494C via a third channel. Each signal provided via a respective channel may be used to power the corresponding LED device or group of LED emitters, and the duty cycle of the signal may determine the overall duration of on and off states of each respective group. The duration of the on and off states may result in an overall light effect which may have light properties (e.g., correlated color temperature (CCT), color point or brightness) based on the duration. In operation, the color tuning circuitry may change the relative magnitude of the duty cycles of the first, second and third signals to adjust the respective light properties of each of the groups of LED emitters to provide a composite light with the desired emission from the LED array 494. As noted above, the light output of the LED array 494 may have a color point that is based on the combination (e.g., mix) of the light emissions from each of the groups of LED emitters 494A, 494B and 494C. While the embodiments described above are with respect to a two channel driver, one of ordinary skill in the art will understand that a third group of LED emitters driven by a third channel may be added to the embodiments described above, if desired, such that a first group of desaturated orange LED emitters, a second group of desaturated cyan LED emitters and a third group of a third color of LED emitters are provided on the LED array 494. In other embodiments, a two channel driver may operate similarly to the embodiment illustrated in FIG. 3E with two drive channels LED 1+ and LED 2+ being used without the third drive channel LED 3+.

In operation, the power module 452 may receive a control input generated based on user and/or sensor input and provide signals via the individual channels to control the composite color of light output by the LED array 494 based on the control input. In some embodiments, a user may provide input to the LED lighting system by turning a knob or moving a slider that may be part of, for example, a sensor module (not shown). Additionally or alternatively, in some embodiments, a user may provide input to the LED lighting system 400E using a smartphone and/or other electronic device to transmit an indication of a desired color to a wireless module (not shown).

Figure 4:
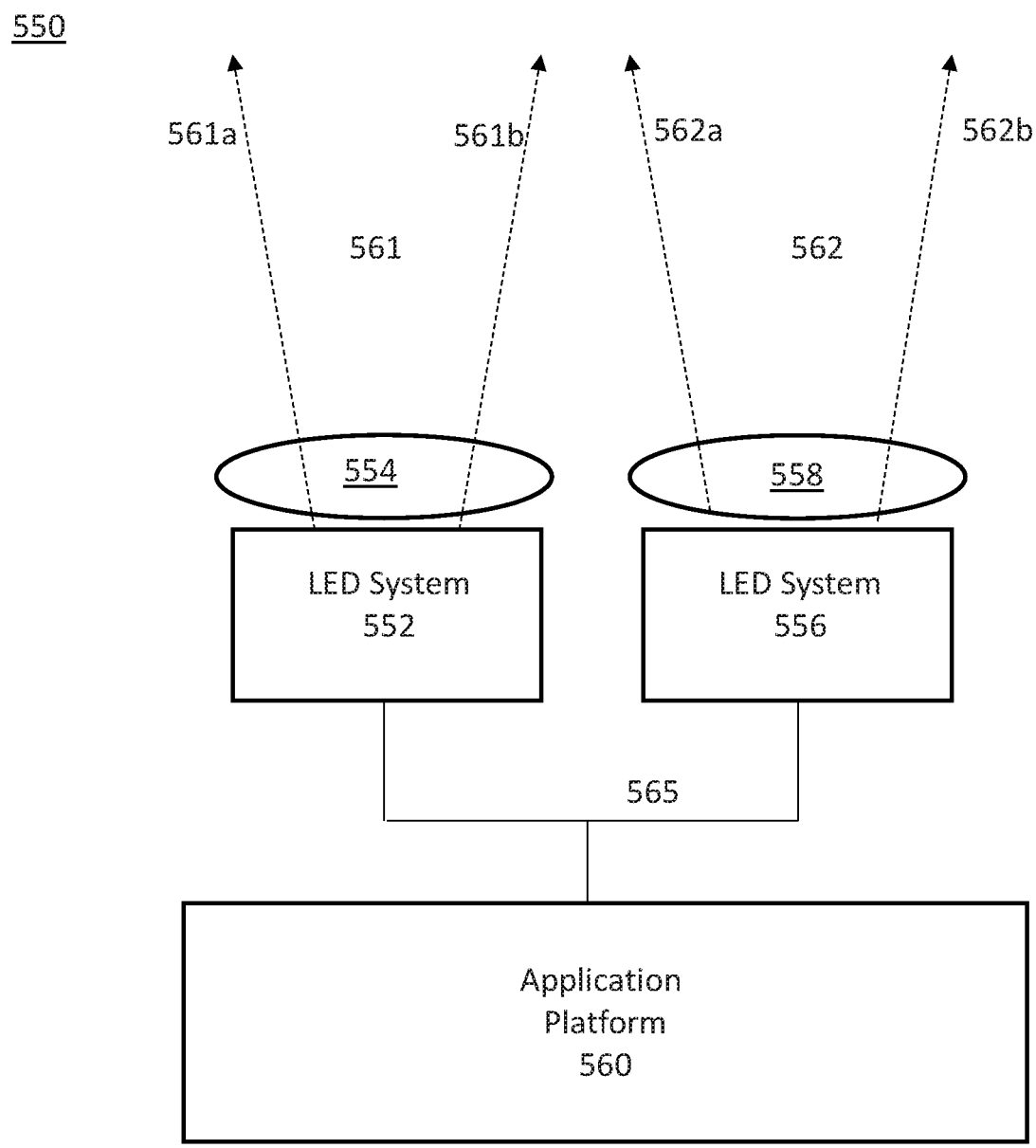
FIG. 4 is a diagram of an example application system.

FIG. 4 shows an example system 550, which includes an application platform 560, LED lighting systems 552 and 556, and secondary optics 554 and 558. The LED lighting system 552 produces light beams 561 shown between arrows 561a and 561b. The LED lighting system 556 may produce light beams 562 between arrows 562a and 562b. In the embodiment shown in FIG. 4, the light emitted from LED lighting system 552 passes through secondary optics 554, and the light emitted from the LED lighting system 556 passes through secondary optics 558. In alternative embodiments, the light beams 561 and 562 do not pass through any secondary optics. The secondary optics may be or may include one or more light guides. The one or more light guides may be edge lit or may have an interior opening that defines an interior edge of the light guide. LED lighting systems 552 and/or 556 may be inserted in the interior openings of the one or more light guides such that they inject light into the interior edge (interior opening light guide) or exterior edge (edge lit light guide) of the one or more light guides. LEDs in LED lighting systems 552 and/or 556 may be arranged around the circumference of a base that is part of the light guide. According to an implementation, the base may be thermally conductive. According to an implementation, the base may be coupled to a heat-dissipating element that is disposed over the light guide. The heat-dissipating element may be arranged to receive heat generated by the LEDs via the thermally conductive base and dissipate the received heat. The one or more light guides may allow light emitted by LED lighting systems 552 and 556 to be shaped in a desired manner such as, for example, with a gradient, a chamfered distribution, a narrow distribution, a wide distribution, an angular distribution, or the like.

In example embodiments, the system 550 may be a mobile phone of a camera flash system, indoor residential or commercial lighting, outdoor light such as street lighting, an automobile, a medical device, AR/VR devices, and robotic devices. The integrated LED lighting system 400A shown in FIG. 3A, the integrated LED lighting system 400B shown in FIG. 3B, the LED lighting system 400C shown in FIG. 3C, and the LED lighting system 400D shown in FIG. 3D illustrate LED lighting systems 552 and 556 in example embodiments.

The application platform 560 may provide power to the LED lighting systems 552 and/or 556 via a power bus via line 565 or other applicable input, as discussed herein. Further, application platform 560 may provide input signals via line 565 for the operation of the LED lighting system 552 and LED lighting system 556, which input may be based on a user input/preference, a sensed reading, a pre-programmed or autonomously determined output, or the like. One or more sensors may be internal or external to the housing of the application platform 560.

In various embodiments, application platform 560 sensors and/or LED lighting system 552 and/or 556 sensors may collect data such as visual data (e.g., LIDAR data, IR data, data collected via a camera, etc.), audio data, distance based data, movement data, environmental data, or the like or a combination thereof. The data may be related a physical item or entity such as an object, an individual, a vehicle, etc. For example, sensing equipment may collect object proximity data for an ADAS/AV based application, which may prioritize the detection and subsequent action based on the detection of a physical item or entity. The data may be collected based on emitting an optical signal by, for example, LED lighting system 552 and/or 556, such as an IR signal and collecting data based on the emitted optical signal. The data may be collected by a different component than the component that emits the optical signal for the data collection. Continuing the example, sensing equipment may be located on an automobile and may emit a beam using a vertical-cavity surface-emitting laser (VCSEL). The one or more sensors may sense a response to the emitted beam or any other applicable input.

Figure 5A:
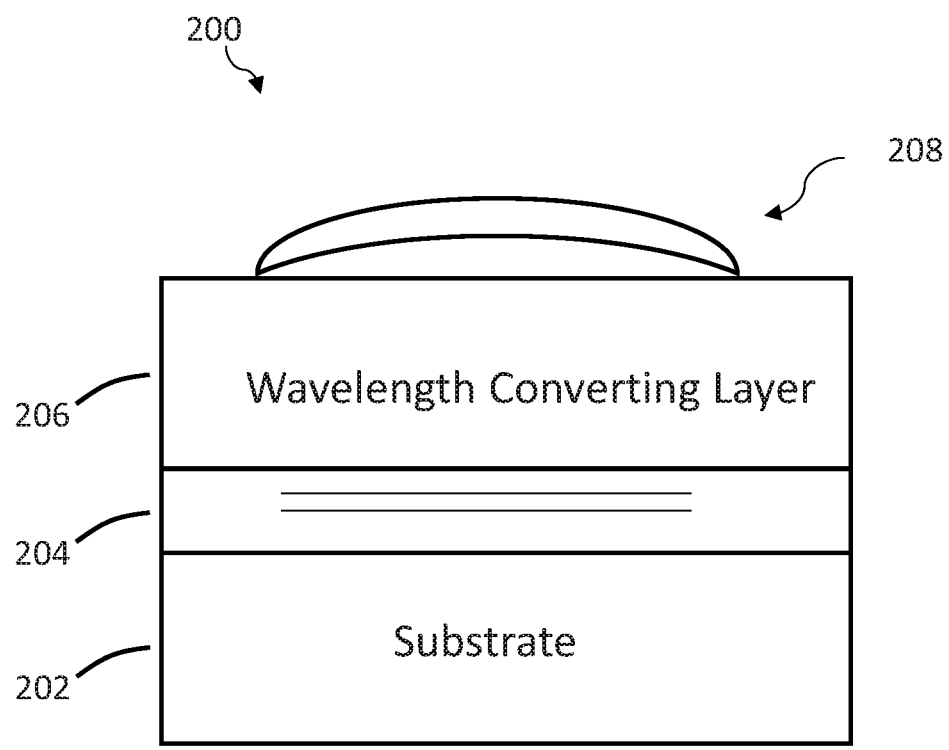
FIG. 5A is a diagram of an example LED device.
Figure 5B:
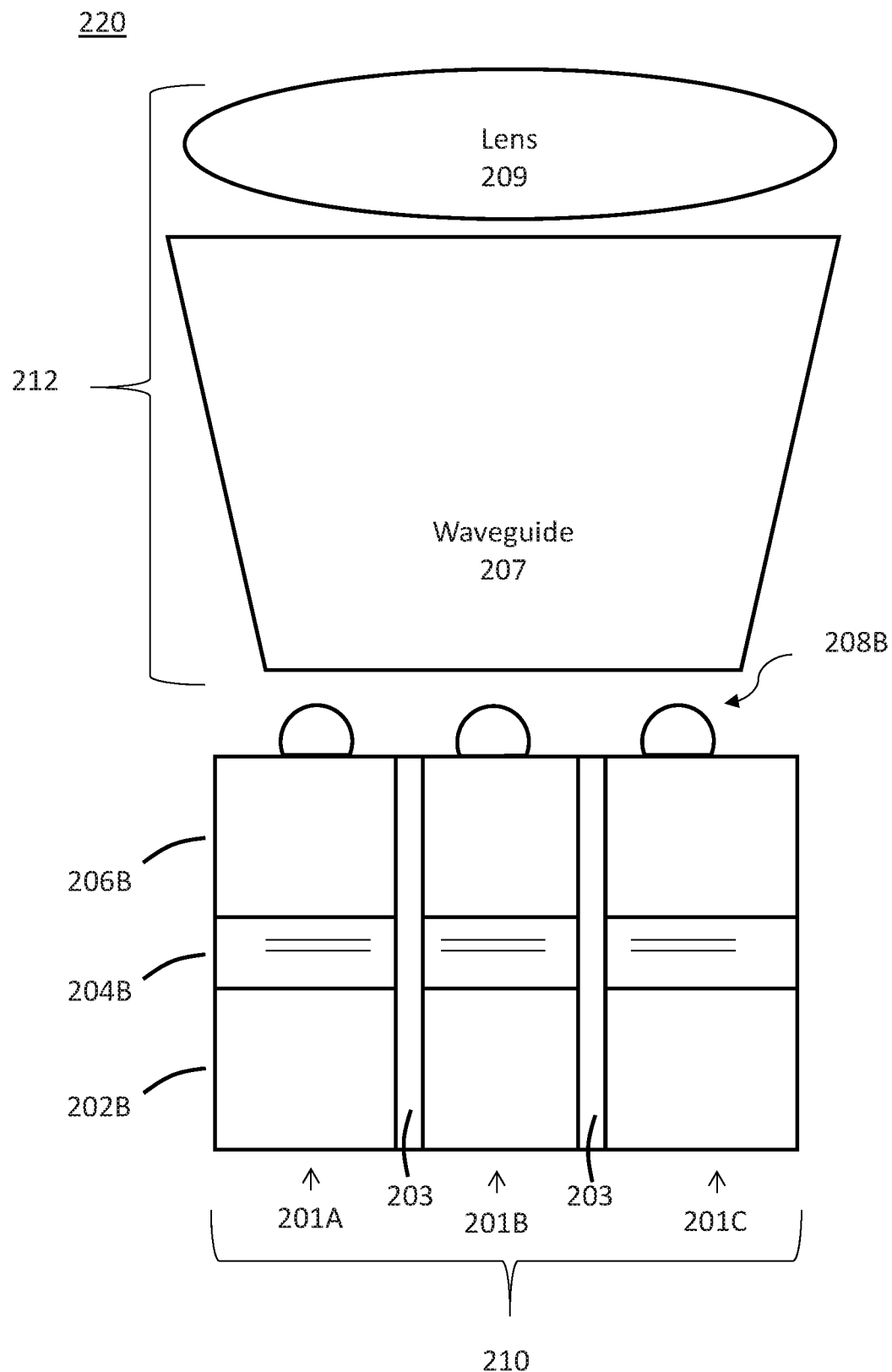
FIG. 5B is a diagram of an example LED system.

FIG. 5A is a diagram of an LED device 200 in an example embodiment. The LED device 200 may include a substrate 202, an active layer 204, a wavelength converting layer 206, and primary optic 208. In other embodiments, an LED device may not include a wavelength converting layer and/or primary optics. Individual LED devices 200 may be included in an LED array in an LED lighting system, such as any of the LED lighting systems described above, and may be referred to as emitters.

As shown in FIG. 5A, the active layer 204 may be adjacent to the substrate 202 and emits pump light when excited. Suitable materials used to form the substrate 202 and the active layer 204 include sapphire, SiC, GaN, Silicon and may more specifically be formed from a III-V semiconductors including, but not limited to, AlN, AlP, AlAs, AlSb, GaN, GaP, GaAs, GaSb, InN, InP, InAs, InSb, II-VI semiconductors including, but not limited to, ZnS, ZnSe, CdSe, CdTe, group IV semiconductors including, but not limited to Ge, Si, SiC, and mixtures or alloys thereof.

The wavelength converting layer 206 may be remote from, proximal to, or directly above active layer 204. The active layer 204 emits pump light into the wavelength converting layer 206. The wavelength converting layer 206 acts to further modify wavelength of the emitted light by the active layer 204 by absorbing at least a portion of the pump light and emitting light such that a combined light emitted from each of the LED device has a particular color point. LED devices that include a wavelength converting layer are often referred to as phosphor converted LEDs ("PCLED"). The wavelength converting layer 206 may include any luminescent material, such as, for example, phosphor particles in a transparent or translucent binder or matrix, or a ceramic phosphor element, which absorbs light of one wavelength and emits light of a different wavelength.

The primary optic 208 may be on or over one or more layers of the LED device 200 and allow light to pass from the active layer 204 and/or the wavelength converting layer 206 through the primary optic 208. The primary optic 208 may be a lens or encapsulate configured to protect the one or more layers and to, at least in part, shape the output of the LED device 200. Primary optic 208 may include transparent and/or semi-transparent material. In example embodiments, light via the primary optic may be emitted based on a Lambertian distribution pattern. It will be understood that one or more properties of the primary optic 208 may be modified to produce a light distribution pattern that is different than the Lambertian distribution pattern.

FIG. 5B shows a cross-sectional view of an LED system 220 including an LED array 210 with LED emitters 201A, 201B, and 201C, as well as secondary optics 212 in an example embodiment. The LED array 210 includes LED emitters 201A, 201B, and 201C each including a respective wavelength converting layer 206B active layer 204B and a substrate 202B. The LED array 210 may be a monolithic LED array manufactured using wafer level processing techniques, a micro LED with sub-500 micron dimensions, or the like. LED emitters 201A, 201B, and 201C, in the LED array 210 may be formed using array segmentation, or alternatively using pick and place techniques.

The spaces 203 shown between one or more LED emitters 201A, 201B, and 201C may include an air gap or may be filled by a material such as a metal material which may be a contact (e.g., n-contact).

The secondary optics 212 may include one or both of the lens 209 and waveguide 207. It will be understood that although secondary optics are discussed in accordance with the example shown, in example embodiments, the secondary optics 212 may be used to spread the incoming light (diverging optics), or to gather incoming light into a collimated beam (collimating optics). In example embodiments, the waveguide 207 may be a concentrator and may have any applicable shape to concentrate light such as a parabolic shape, cone shape, beveled shape, or the like. The waveguide 207 may be coated with a dielectric material, a metallization layer, or the like used to reflect or redirect incident light. In alternative embodiments, a lighting system may not include one or more of the following: the wavelength converting layer 206B, the primary optics 208B, the waveguide 207 and the lens 209.

Lens 209 may be formed form any applicable transparent material such as, but not limited to SiC, aluminum oxide, diamond, or the like or a combination thereof. Lens 209 may be used to modify the a beam of light input into the lens 209 such that an output beam from the lens 209 will efficiently meet a desired photometric specification. Additionally, lens 209 may serve one or more aesthetic purpose, such as by determining a lit and/or unlit appearance of the LED emitters 201A, 201B and/or 2010 of the LED array 210.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A light emitting device comprising:
    at least a first phosphor-converted LED configured to emit light having a desaturated orange color point characterized by CIE 1976 color coordinates $0.3<u'<0.35$ and $v'>0.52$; and
    at least a second phosphor-converted LED configured separately from the first phosphor-converted LED to emit light having a cyan color point characterized by CIE 1976 color coordinates $0.15<u'<0.20$ and $0.47<v'<0.52$;
    the first phosphor-converted LED and the second phosphor-converted LED arranged to combine the light emitted by the first phosphor-converted LED with the light emitted by the second phosphor-converted LED to provide a white light output from the light emitting device.

2. The light emitting device of claim 1, comprising a driver configured to separately control the drive current, the duty cycle, or the drive current and the duty cycle to the first phosphor-converted LED and to the second phosphor converted-LED to control the Correlated Color Temperature and power of the white light output from the light emitting device throughout a Correlated Color Temperature range of about 2700K to about 4000K.

3. The light emitting device of claim 2, wherein the white light output from the light emitting device has a Color Rendering Index greater than about 70 throughout the Correlated Color Temperature range of about 2700K to about 4000K.

4. The light emitting device of claim 2, wherein the driver is configured to separately control the drive current, the duty cycle, or the drive current and the duty cycle to the first phosphor-converted LED and to the second phosphor converted-LED to control the Correlated Color Temperature and power of the white light output from the light emitting device throughout a Correlated Color Temperature range of about 2000K to about 4000K.

5. The light emitting device of claim 4, wherein the white light output from the light emitting device has a Color Rendering Index greater than about 60 throughout the Correlated Color Temperature range of about 2000K to about 4000K.

6. The light emitting device of claim 1, wherein:
    the first phosphor-converted LED comprises a first LED configured to emit blue or violet light and a first phosphor configured to absorb at least a portion of the blue or violet light emitted by the first LED and in response emit light with a peak emission wavelength between about 590 nm and about 650 nm; and
    the second phosphor-converted LED comprises a second LED configured to emit blue or violet light and a second phosphor configured to absorb at least a portion of the blue or violet light emitted by the second LED and in response emit light with a peak emission wavelength between about 500 nm and about 560 nm.

7. The light emitting device of claim 6, wherein the first phosphor comprises a 2-5-8 nitride phosphor material and the second phosphor comprises one or more garnet phosphor materials.

8. The light emitting device of claim 7, wherein the first phosphor comprises a 2-5-8 phosphor nitride material having a formula $[Eu_y, Ba_d, Sr_{(1-y-d)}]_2Si_5N_8$, with $0.003<y<0.03$ and $0.2<d<0.6$.

9. The light emitting device of claim 8, wherein the second phosphor comprises a garnet phosphor having a formula $[Ce_x, Lu_a, Y_{(1-a-x)}]_3[Ga_b, Al_{(1-b)}]_5O_{12}$, with $0.01<x<0.06$, $0<a<1-x$, $0<b<0.6$.

10. The light emitting device of claim 8, wherein the second phosphor comprises a mixture of two or more garnet phosphors having different compositions.

11. The light emitting device of claim 6, wherein the second phosphor comprises a garnet phosphor having a formula $[Ce_x, Lu_a, Y_{(1-a-x)}]_3[Ga_b, Al_{(1-b)}]_5O_{12}$, with $0.01<x<0.06$, $0<a<1-x$, $0<b<0.6$.

12. The light emitting device of claim 6, wherein the second phosphor comprises a mixture of two or more garnet phosphors having different compositions.

13. The light emitting device of claim 1, wherein:
    the first phosphor-converted LED does not comprise a phosphor configured to absorb blue or violet light from the first LED and in response emit green light, and
    the second phosphor-converted LED does not comprise a phosphor configured to absorb blue or violet light from the second LED and in response emit red light.

14. A method of operating a light emitting device, the method comprising:
    driving at least a first phosphor-converted LED to emit light having a desaturated orange color point characterized by CIE 1976 color coordinates $0.3<u'<0.35$ and $v'>0.52$;
    driving at least a second phosphor-converted LED configured separately from the first phosphor-converted LED to emit light having a cyan color point characterized by CIE 1976 color coordinates $0.15<u'<0.20$ and $0.47<v'<0.52$;
    combining the light emitted by the first phosphor-converted LED with the light emitted by the second phosphor-converted LED to provide a white light output from the light emitting device; and
    separately controlling the drive current, the duty cycle, or the drive current and the duty cycle to the first phosphor-converted LED and to the second phosphor converted-LED to control a Correlated Color Temperature and power of the white light output from the light emitting device through a Correlated Color Temperature range of about 2700K to about 4000K.

15. The method of claim 14, comprising separately controlling the drive current, the duty cycle, or the drive current and the duty cycle to the first phosphor-converted LED and to the second phosphor converted-LED to control a Correlated Color Temperature and power of the white light output from the light emitting device through a Correlated Color Temperature range of about 2000K to about 4000K.

16. A light emitting device comprising:
- a first LED configured to emit only a first light having a desaturated orange color consisting of CIE 1976 color coordinates u' and v' in ranges $0.3<u'<0.35$ and $v'>0.52$; and
- a second LED configured to emit only a second light having a cyan color consisting of CIE 1976 color coordinates u' and v' in ranges $0.15<u'<0.20$ and $0.47<v'<0.52$;
- wherein the first LED and the second LED are arranged to combine the first light and the second light.

17. The light emitting device of claim 16, wherein the first LED is a phosphor-converted LED consisting of red nitride phosphors and the second LED is a phosphor-converted LED consisting of green phosphors.

18. The light emitting device of claim 17, wherein the red nitride phosphors have a peak wavelength between 590 nm and 650 nm and the green phosphors have a peak emission wavelength between 500 nm and 560 nm.

19. The light emitting device of claim 16, further comprising a driver configured to separately control an amount of first light and an amount of second light to adjust a Correlated Color Temperature of a combined first light and second light, the Correlated Color Temperature having a tuning range of between about 2000K and about 4000K.

20. The light emitting device of claim 19, wherein the tuning range crosses a Black Body Locus at about 3500K.

\* \* \* \* \*